United States Patent
Mansharamani et al.

(10) Patent No.: US 6,831,891 B2
(45) Date of Patent: Dec. 14, 2004

(54) SYSTEM FOR FABRIC PACKET CONTROL

(75) Inventors: Deepak Mansharamani, San Jose, CA (US); Erol Basturk, Cupertino, CA (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 09/800,678

(22) Filed: Mar. 6, 2001

(65) Prior Publication Data
US 2002/0126634 A1 Sep. 12, 2002

(51) Int. Cl.[7] .............................. H04L 12/28; H04J 3/14
(52) U.S. Cl. ....................................... 370/229; 370/413
(58) Field of Search ............................... 370/229, 230.1, 370/232–234, 252, 253, 352, 395.21, 468, 477, 395.43, 412, 429, 395.71, 230, 235, 416, 418

(56) References Cited

U.S. PATENT DOCUMENTS

| | | | | |
|---|---|---|---|---|
| 5,282,203 A | * | 1/1994 | Oouchi ......................... | 370/232 |
| 5,442,624 A | * | 8/1995 | Bonomi et al. ............. | 370/253 |
| 5,555,264 A | * | 9/1996 | Sallberg et al. ............. | 370/414 |
| 5,768,257 A | * | 6/1998 | Khacherian et al. ........ | 370/414 |
| 5,768,258 A | * | 6/1998 | Van As et al. .............. | 370/236 |
| 5,777,984 A | | 7/1998 | Gun et al. | |
| 5,793,747 A | * | 8/1998 | Kline .......................... | 370/230 |
| 5,828,653 A | * | 10/1998 | Goss .......................... | 370/230 |
| 5,949,757 A | * | 9/1999 | Katoh et al. ................ | 370/235 |
| 6,122,252 A | * | 9/2000 | Aimoto et al. .............. | 370/235 |
| 6,144,640 A | * | 11/2000 | Simpson et al. ............ | 370/236 |
| 6,167,027 A | * | 12/2000 | Aubert et al. ............... | 370/230 |
| 6,246,687 B1 | * | 6/2001 | Siu ............................. | 370/429 |
| 6,292,492 B1 | * | 9/2001 | Bonomi et al. ............. | 370/415 |
| 6,320,845 B1 | * | 11/2001 | Davie ......................... | 370/230 |
| 6,381,649 B1 | * | 4/2002 | Carlson ...................... | 370/232 |

FOREIGN PATENT DOCUMENTS

| | | | | |
|---|---|---|---|---|
| EP | 000731611 A2 | * | 11/1996 | ............ H04N/7/30 |

\* cited by examiner

*Primary Examiner*—Duc Ho
*Assistant Examiner*—Phuongchau Ba Nguyen
(74) *Attorney, Agent, or Firm*—Donald R. Boys; Central Coast Patent Agency, Inc.

(57) ABSTRACT

A method for managing data traffic in nodes in a fabric network, each node having internally-coupled ports, follows the steps of establishing a managed queuing system comprising one or more queues associated with each port, for managing incoming data traffic; and accepting or discarding data directed to a queue according to the quantity of data in the queue relative to queue capacity. In one preferred embodiment the managed system accepts all data directed to a queue less than full, and discards all data directed to a queue that is full. In some alternative embodiments the queue manager monitors quantity of data in a queue relative to queue capacity, and begins to discard data at a predetermined rate when the quantity of queued data reaches the threshold. In other cases the queue manager increases the rate of discarding as the quantity of queued data increases above the preset threshold, discarding all data traffic when the queue is full.

6 Claims, 3 Drawing Sheets

SYSTEM FOR FABRIC PACKET CONTROL

FIELD OF THE INVENTION

The present invention is in the field of routing packets through alternative paths between nodes in a routing fabric, and pertains in particular to methods by which back-ups in a fabric may be avoided.

BACKGROUND OF THE INVENTION

With the advent and continued development of the well-known Internet network, and of similar data-packet networks, much attention has been paid to computing machines for receiving, processing, and forwarding data packets. Such machines, known as routers in the art, typically have multiple interfaces for receiving and sending packets, and circuitry at each interface, including typically a processor, for handling and processing packets. The circuitry at the interfaces is implemented on modules known as line cards in the art. In some routers the line cards are interconnected through what is known as the internal fabric, which comprises interconnected fabric cards handling transmissions through the fabric. Fabric interconnection has not always been a part of routers in the art, and is a fairly recent innovation and addition for packet routers.

FIG. 1, labeled prior art, illustrates a number of interconnected fabric nodes, labeled in this example A through J, each node of which may be fairly considered to comprise a fabric card in a switching fabric in a router. It will be apparent to the skilled artisan that FIG. 1 is an exemplary and partial representation of nodes and interconnections in a switching fabric, and that there are typically many more nodes and interconnections than those shown.

One purpose of FIG. 1 in this context is to illustrate that there are a wide variety of alternative paths that data may take within a switching fabric. For example, transmission from node E to node J may proceed either via path E-F-H-G-J, or alternatively via E-F-D-G-J. The skilled artisan will also recognize that the nodes and interconnections shown are but a tiny fraction of the nodes and interconnections that might be extant in a practical system.

In conventional switching fabric at the time of the present patent application fabric nodes in such a structure are implemented on fabric cards or chips that do Flow Control. Such Flow Control is very well-known in the art, and comprises a process of monitoring ports for real or potential traffic overflow, and notifying an upstream port to stop or slow sending of further data. That is, if node G as shown in FIG. 1, becomes overloaded at a particular input port, for example, the port from D, the Flow Control at G will notify D to restrict or suspend traffic to G In this example, D may receive traffic from upstream neighbors that it cannot forward to G, and it may then have to notify these neighbors to suspend sending traffic to D. This example illustrates how Flow Control may cause traffic changes made by nodes as a result of an overflow condition at a downstream node to propagate further upstream affecting further nodes, and further stopping or diverting traffic. In FIG. 1 arrows between nodes are indicative of Flow Control indicators passed, and the skilled artisan will also understand that traffic may be in any direction, and that Flow Control indicators are therefore passed in both directions as well.

A serious problem with Flow Control as conventionally practiced is that the upstream notifications, inherent in flow control, propagate further upstream and hinder or stop traffic that there is no need to stop, partly because the interconnections of nodes may be quite complicated and the alternative paths quite numerous. Further, a node that has been informed of a downstream overload condition cannot select to stop or divert traffic just for that particular link, but only to stop or divert all traffic. These effects, because of the complexity and interconnection of nodes in a fabric, can result in complete stultification of parts of a system, or of an entire network.

There have been in the art several attempts to improve upon flow control, but all such solutions have only been partly successful, and still use upstream propagation of control indicators, which always still have a good chance of causing unwanted difficulty.

What is clearly needed is a way to deal with temporary overloads at fabric nodes without resorting to problematic upstream messaging without impacting traffic that does not need to use the overloaded link.

SUMMARY OF THE INVENTION

In a preferred embodiment of the present invention a method for managing data traffic at switching element in a fabric network, each node having two or more internally coupled ports is provided, comprising the steps of (a) establishing a managed queuing system comprising one or more queues associated with each port, for managing incoming data traffic; and (b) accepting or discarding data directed to a queue according to the quantity of data in the queue relative to queue capacity.

In some embodiments all data is discarded for a full queue. In some other embodiments the queue manager monitors quantity of queued data in relation to a preset threshold, and begins to discard data at a predetermined rate when the quantity of queued data reaches the threshold. In still other embodiments the queue manager increases the rate of discarding as quantity of queued data increases above the preset threshold, discarding all data traffic when the queue is full.

In another aspect of the invention a switching element for a fabric network is provided, comprising two or more internally-coupled ports, and a managed queuing system comprising one or more queues associated with each port, for managing incoming data traffic. The switching element is characterized in that the queue manager accepts or discards data directed to a queue according to the quantity of data in the queue relative to queue capacity.

In some embodiments all data is discarded for a full queue. In some other embodiments the queue manager monitors quantity of queued data against a preset threshold, and begins to randomly discard data when the quantity of queued data exceeds the threshold. In still other embodiments the queue manager increases the rate of discarding as the quantity of queued data increases above the preset threshold.

In still another aspect of the invention a data router having external connections to other data routers is provided, comprising an internal fabric network, and a plurality of switching elements in the internal fabric network, each having internally-coupled ports, and a managed queuing system comprising one or more queues associated with each port, for managing incoming data traffic. The router is characterized in that the queue manager accepts or discards data directed to a queue according to the quantity of data in the queue relative to queue capacity.

In some embodiments all data is discarded for a full queue. In some other embodiments the queue manager monitors quantity of queued data against a preset threshold, and begins to randomly discard data when the quantity of queued data exceeds the threshold. In still other embodiments the queue manager increases the rate of discarding as the quantity of queued data increases above the preset threshold.

In various embodiments of the invention taught below in enabling detail, for the first time a system is provided for routers that accomplished the purposes of flow control without requiring upstream notification of problems, which can often result in extensive and unnecessary cessation or diversion of traffic.

BRIEF DESCRIPTIONS OF THE DRAWING FIGURES

DESCRIPTION OF THE PREFERRED EMBODIMENTS

Figure 1:
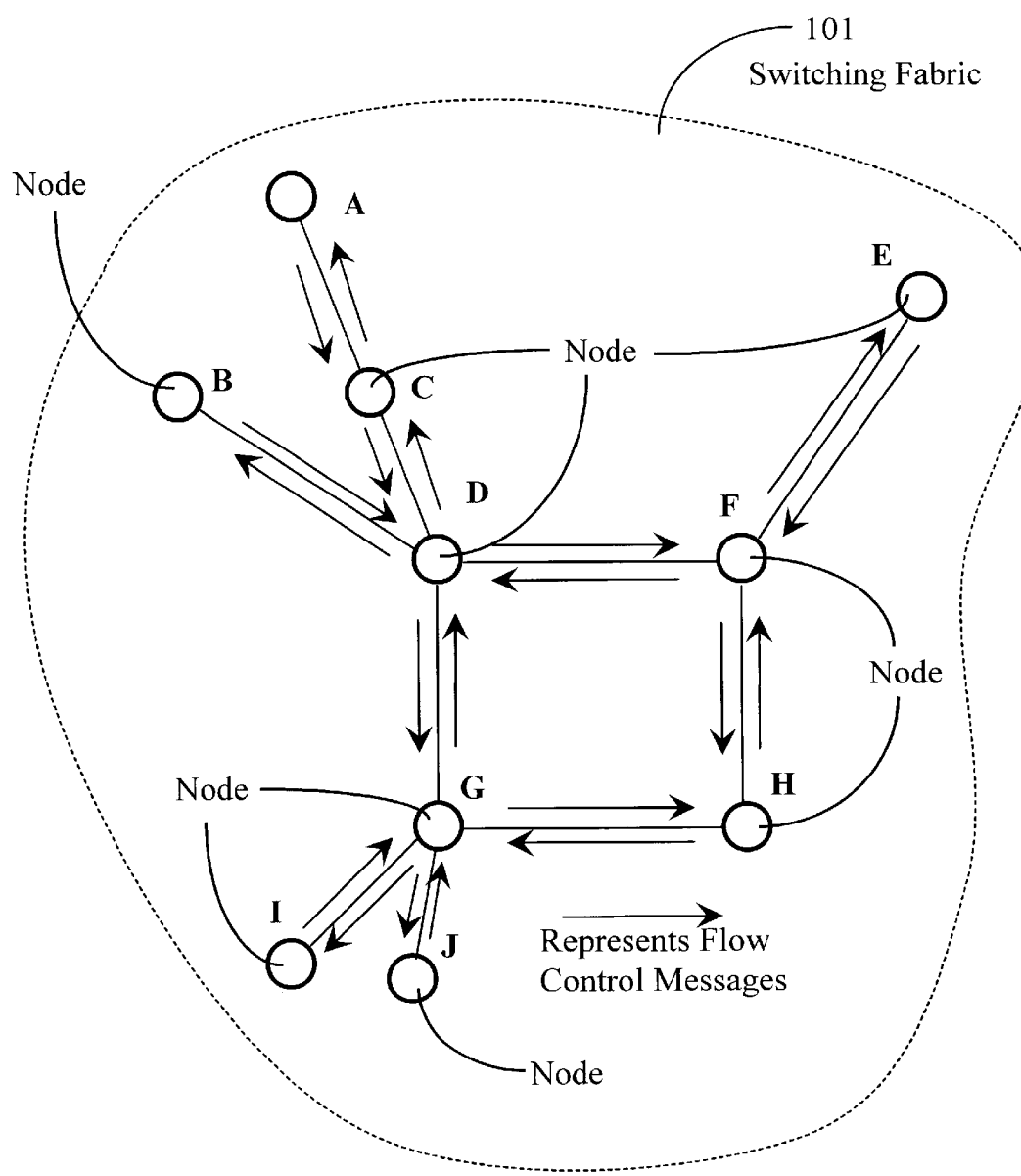
FIG. 1 is a prior art diagram illustrating fabric node interconnections and upstream propagation of flow control indicators.
Figure 2:
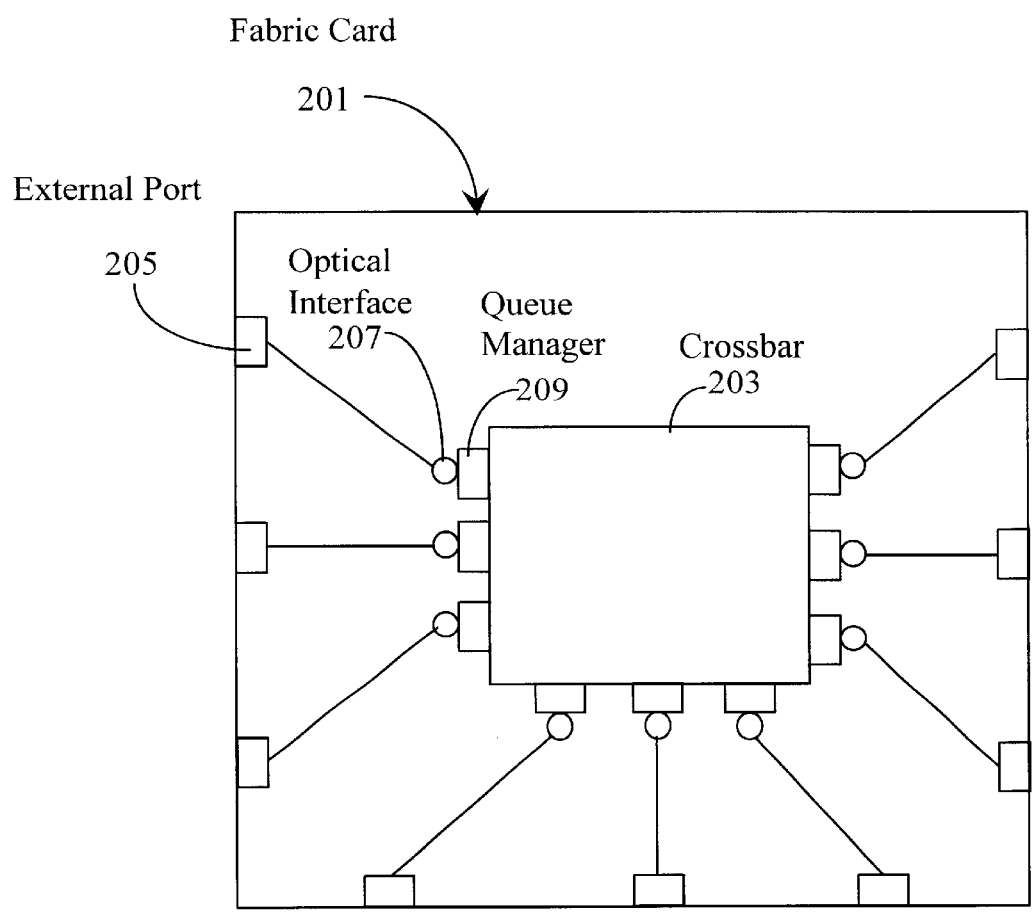
FIG. 2 is a diagram of a fabric card in an embodiment of the present invention.

FIG. 2 is a plan view of a fabric card 201 in an embodiment of the present invention. In this embodiment there are nine (9) ports on each card, rather than four as indicated in the prior art diagram of FIG. 1. This is not meant to imply that the prior art is limited to four ports per node, as FIG. 1 was exemplary only.

In the fabric card of this embodiment, as shown in FIG. 2, there are nine queue managers 209, one for each external port 205, with each queue manager isolated from its connected external port by an optical interface 207. The inter-node communication in this embodiment is by optical links. Queue managers 209 interface with crossbar 203, which connects each of the nine ports with the other eight ports internally in this embodiment, although these internal connections are not shown in the interest of simplicity.

Figure 3:
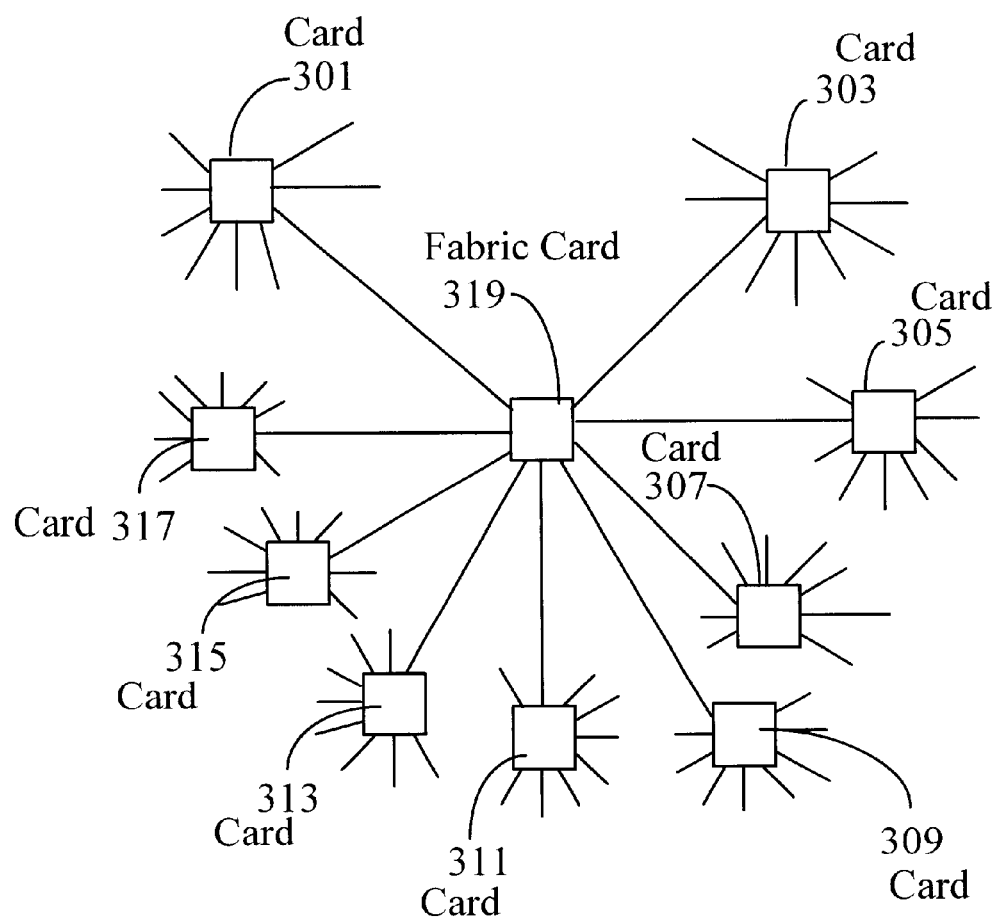
FIG. 3 is a diagram of a fabric network of fabric cards in an embodiment of the present invention.

FIG. 3 is a diagram illustrating a fabric having interconnected fabric cards according to the embodiment described above with reference to FIG. 2. In this diagram one card 319 is shown connected to nine neighbor cards 301, 303, 305, 307, 309, 311, 313, 315, and 317. Each of the neighbor cards is illustrated as having eight additional ports for interconnecting to further neighbors in addition to the one port connecting the near neighbor with card 319. It will be clear to the skilled artisan from this diagram that interconnection complexity escalates at a very great rate as ports and cards (nodes) proliferate.

Referring now back to FIG. 2, each port on each card in this example passes through a queue management gate 209 as indicated in FIG. 2. Each queue manager comprises a set of virtual output queues (VOQ), with individual VOQs associated with individual ones of the available outputs on a card. This VOQ queuing system manages incoming flows based on the outputs to which incoming packets are directed. Data traffic coming in on any one port, for example, is directed to a first-in-first-out (FIFO) queue associated with an output port, and the queue manager is enabled to discard all traffic when the queue to which data is directed is full. There are, in this scheme, no Flow Control indications generated and propagated upstream as is done in the prior art.

In this unique arrangement the size of each queue is set to provide adequate flow under ordinary, and to some extent extraordinary, load conditions without data loss, but under extreme conditions, when a queue is full, data is simply discarded until the situation corrects, which the inventors have found to be less conducive to data loss than the problems associated with conventional Flow Control, which uses the previously described upstream-propagated Flow Control indicators.

In an alternative embodiment of the present invention each queue manager on a card has an ability to begin to drop packets at a pre-determined rate at some threshold in queue capacity short of a full queue. In certain further embodiments the queue manager may accelerate the rate of packet dropping as a queue continues to fill above the first threshold. In these embodiments the incidence of dropping packets is minimized and managed, and spread over more traffic than would be the case if dropping of packets were to begin only at a full queue, wherein all packets would be dropped until the queue were to begin to empty.

A distinct advantage of the queue management scheme of the present invention is that the intelligence required is considerably lessened, and there is no addition to the traffic load by generating Flow Control indicators.

It will be apparent to the person with ordinary skill in the art that the embodiments of the invention described in this specification are exemplary, and may vary in a number of ways without departing form the spirit and scope of the present invention. For example, there may be more or fewer than nine ports and queue managers per fabric card, the system may be implemented on a chip or a set of chips, and the size of each queue may vary. There are many other alterations within the spirit and scope of the invention as well, and the scope of the invention is limited only by the claims which follow.

What is claimed is:

1. A method for managing data traffic at switching element nodes in a fabric network, each switching element node having a plurality of input and output ports, comprising the steps of:

(a) establishing at each input port, a number of virtual output queues equal to the number of output ports, each virtual output queue at each individual input port dedicated to an individual output port, storing only packets destined for the associated output port, for managing incoming data traffic; and (b) accepting or discarding data at each virtual output queue directed to a queue according to a quantity of data in the queue relative to queue capacity by providing a queue manager for monitoring quantity of queued data in relation to a preset threshold, and discarding data from each virtual output queue at a predetermined rate, when the quantity of queued data reaches or exceeds the threshold;

wherein in step (b), the queue manager increases the rate of discarding as quantity of queued data increases above the preset threshold, discarding all data traffic when the queue is full.

2. The method of claim 1 wherein, in step (b), all data is discarded for a full queue.

3. A switching element node for a fabric network, comprising:

a plurality of input an output ports;

a number of virtual output queues at each input port equal to the number of output ports, each virtual output queue at each individual input port dedicated to an individual output port, storing only packets destined for the associated output port, for managing incoming data traffic; and characterized in that a queue manager accepts or discards data directed to a queue according to a quantity of data in the queue relative to the queue capacity by monitoring quantity of queued data against a preset threshold, and discarding data from each virtual output queue at a predetermined rate, when the quantity of queued data reaches or exceeds the threshold;

wherein the queue manager increases the rate of discarding as quantity of queued data increases above the preset threshold.

4. The switching element of claim 3 wherein all data is discarded for a full queue.

5. A data router having external connections to other data routers, comprising:

an internal fabric network; and a plurality of switching element nodes in the internal fabric network, each switching element node having a plurality of input and output ports, and at each input port, a number of virtual output queues equal to the number of output ports, each virtual output queue at each individual input port dedicated to an individual output port, storing only packets destined for the associated output port, for managing incoming data traffic;

characterized in that a queue manager accepts or discards data directed to a queue according to a quantity of data in the queue relative to the queue capacity by monitoring the quantity of queued data against a preset threshold, and begin to discard data from each virtual output queue at a predetermined rate, when the quantity of queued data reaches or exceeds the threshold;

wherein the queue manager increases the rate of discarding as quantity of queued data increases above the preset threshold.

6. The data router of claim 5 wherein all data is discarded for a full queue.

* * * * *